(12) United States Patent
Reichman et al.

(10) Patent No.: US 6,171,726 B1
(45) Date of Patent: Jan. 9, 2001

(54) ACTIVE ELECTRODE COMPOSITION WITH NONFILBRILLATING BINDER

(75) Inventors: Benjamin Reichman, West Bloomfield; William Mays, Livonia; Michael A. Fetcenko, Rochester Hills, all of MI (US)

(73) Assignee: Energy Conversion Devices, Inc., Troy, MI (US)

( * ) Notice: Under 35 U.S.C. 154(b), the term of this patent shall be extended for 0 days.

(21) Appl. No.: 09/221,676

(22) Filed: Dec. 24, 1998

(51) Int. Cl.[7] ............................. H01M 4/58; H01M 4/62; C22C 6/24
(52) U.S. Cl. ...................... 429/218.2; 429/217; 429/206; 420/900
(58) Field of Search ................................. 429/218.2, 223, 429/206, 217; 420/900

(56) References Cited

U.S. PATENT DOCUMENTS

| | | | |
|---|---|---|---|
| 5,219,685 | * | 6/1993 | Taniguchi et al. .................... 429/217 |
| 5,707,763 | * | 1/1998 | Shimizu et al. ...................... 429/217 |
| 5,851,698 | * | 12/1998 | Reichman et al. .................... 429/223 |

* cited by examiner

Primary Examiner—Stephen Kalafut
Assistant Examiner—Angela J. Martin
(74) Attorney, Agent, or Firm—Philip H. Schlazer; Marvin S. Siskind; David W. Schumaker

(57) ABSTRACT

An active composition for an electrode of an electrochemical cell. The active composition comprises an electrode material, and a nonfibrillating polymeric binder. The polymeric binder may comprise a fluoradditive. Also disclosed in an electrode and an electrochemical cell comprising the active composition.

30 Claims, No Drawings

ACTIVE ELECTRODE COMPOSITION WITH NONFILBRILLATING BINDER

FIELD OF THE INVENTION

The present invention relates to active formulations for electrodes of electrochemical cells. In particular, the present invention relates to active formulations comprising polymeric binders for use in metal hydride negative electrodes used in Ni—MH electrochemical cells.

BACKGROUND OF THE INVENTION

In rechargeable electrochemical cells, weight and portability are important considerations. It is also advantageous for rechargeable cells to have long operating lives without the necessity of periodic maintenance. Rechargeable electrochemical cells are used in numerous consumer devices such as calculators, portable radios, and cellular phones. They are often configured into a sealed power pack that is designed as an integral part of a specific device. Rechargeable electrochemical cells can also be configured as larger "cell packs" or "battery packs".

Rechargeable electrochemical cells may be classified as "nonaqueous" cells or "aqueous" cells. An example of a nonaqueous electrochemical cell is a lithium-ion cell which uses intercalation compounds for both anode and cathode, and a liquid organic or polymer electrolyte. Aqueous electrochemical cells may be classified as either "acidic" or "alkaline". An example of an acidic electrochemical cell is a lead-acid cell which uses lead dioxide as the active material of the positive electrode and metallic lead, in a high-surface area porous structure, as the negative active material. Examples of alkaline electrochemical cells are nickel cadmium cells (Ni—Cd) and nickel-metal hydride cells (Ni—MH). Ni—MH cells use negative electrodes having a hydrogen absorbing alloy as the active material. The hydrogen absorbing alloy is capable of the reversible electrochemical storage of hydrogen. Ni—MH cells typically use a positive electrode having nickel hydroxide as the active material. The negative and positive electrodes are spaced apart in an alkaline electrolyte such as potassium hydroxide.

Upon application of an electrical potential across a Ni—MH cell, the hydrogen absorbing alloy active material of the negative electrode is charged by the electrochemical absorption of hydrogen and the electrochemical discharge of a hydroxyl ion, forming a metal hydride. This is shown in equation (1):

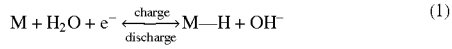
$$M + H_2O + e^- \underset{discharge}{\overset{charge}{\rightleftarrows}} M\text{—}H + OH^- \quad (1)$$

The negative electrode reactions are reversible. Upon discharge, the stored hydrogen is released from the metal hydride to form a water molecule and release an electron.

Hydrogen absorbing alloys called "Ovonic" alloys result from tailoring the local chemical order and local structural order by the incorporation of selected modifier elements into a host matrix. Disordered hydrogen absorbing alloys have a substantially increased density of catalytically active sites and storage sites compared to single or multi-phase crystalline materials. These additional sites are responsible for improved efficiency of electrochemical charging/discharging and an increase in electrical energy storage capacity. The nature and number of storage sites can even be designed independently of the catalytically active sites. More specifically, these alloys are tailored to allow bulk storage of the dissociated hydrogen atoms at bonding strengths within the range of reversibility suitable for use in secondary battery applications.

Some extremely efficient electrochemical hydrogen storage alloys were formulated, based on the disordered materials described above. These are the Ti—V—Zr—Ni type active materials such as disclosed in U.S. Pat. No. 4,551,400 ("the '400 Patent") the disclosure of which is incorporated herein by reference. These materials reversibly form hydrides in order to store hydrogen. All the materials used in the '400 Patent utilize a generic Ti—V—Ni composition, where at least Ti, V, and Ni are present and may be modified with Cr, Zr, and Al. The materials of the '400 Patent are multiphase materials, which may contain, but are not limited to, one or more phases with $C_{14}$ and $C_{15}$ type crystal structures.

Other Ti—V—Zr—Ni alloys, also used for rechargeable hydrogen storage negative electrodes, are described in U.S. Pat. No. 4,728,586 ("the '586 Patent"), the contents of which is incorporated herein by reference. The '586 Patent describes a specific sub-class of Ti—V—Ni—Zr alloys comprising Ti, V, Zr, Ni, and a fifth component, Cr. The '586 Patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them. Other hydrogen absorbing alloy materials are discussed in U.S. Pat. Nos. 5,096,667, 5,135,589, 5,277,999, 5,238,756, 5,407,761, and 5,536,591, the contents of which are incorporated herein by reference.

The hydrogen storage alloy negative electrode may be paste type or non-paste type. Non-paste type electrodes are formed by pressing or compacting the active hydrogen absorbing alloy onto a conductive substrate. A method of fabricating non-paste types negative electrodes is disclosed in U.S. Pat. No. 4,820,481 ("the '481 Patent") the disclosure of which is incorporated herein by reference.

As described in the '481 Patent, a hydrogen storage alloy powder is loaded into a loss in weight feeder. The powder is released from the feeder and passes, through a feeder hose, onto a vibrating chute assembly. The powder is vibrated along the chute assembly to a material divider which is adapted to distribute the active electrode material in an even, uniform manner onto a moving continuous web of substrate material. After the active material is distributed onto the substrate surface, it is compacted onto the substrate by a rolling mill. It is noted that the distribution of active material onto the substrate is important to electrode performance since performance is directly related to the uniformity of both the density and thickness of the active material.

In the specific method described by the '481 Patent, the newly formed continuous web of electrode material (i.e., substrate with compacted active material) is sintered to increase its mechanical durability and cycle life. Sintering promotes both the particle-to-particle bonding of the active material as well as the bonding of the active material particles to the substrate.

Sintering is an expensive and time-consuming step in the electrode fabrication process. To reduce the need for sintering, a binder may be added to the hydrogen alloy powder to increase the durability and cycle life of the electrode. U.S. Pat. No. 5,753,386 (the '386 Patent), U.S. Pat. No. 5,707,763 (the '763 Patent), and U.S. Pat. No. 5,393,617 (the '617 Patent) all disclose using binders with active electrode materials. The contents of U.S. Pat. Nos.

5,753,386, 5,707,763, and 5,393,617 are incorporated by reference herein.

The binders disclosed by the '386, '763, and '617 Patents are "fibrillating" binders comprising, at least in part, a fibrillating component. The '386 Patent describes a non-paste type hydrogen absorbing alloy electrode. The active material is made by combining a hydrogen absorbing alloy powder and a polymer binder. As stated on column 12, lines 40–47 of the '386 Patent: "When . . . the nonpaste type hydrogen absorbing-alloy electrode . . . is made, polytetrafluoroethylene (PTFE) is preferably used as the polymer binder because PTFE is made to fibers by being stirred . . . ." The '763 Patent discloses a binder having both a fibrillating component (a core) and a nonfibrillating component (a shell) where the ratio by weight of the fibrillating to nonfibrillating components (core-to-shell ratio) is between 98:2 to 50:50. The '617 Patent describes a mixture of a mischmetal hydride alloy, and a TEFLON powder which "was fibrillated to form a fibrous, lace-like network . . ." (column 10, lines 24–26 of the '617 Patent).

A fibrillating polymer fibrillates when mixed or stirred, developing a fibrous, lace-like, agglomerated consistency. The composition formed by mixing a fibrillating binder with an active material thus has a consistency which cannot be used with an electrode fabrication process like the one described by the '481 Patent. The agglomerated, gummy consistency hinders (or even totally blocks) the flow of the material through the feeder, powder chute and material divider, thereby preventing uniform delivery to the substrate.

A new active electrode composition is needed which has a consistency that can be used with an electrode fabrication process like the one described in the '481 Patent, and which includes a polymeric binder for increased strength, durability and cycle life.

SUMMARY OF THE INVENTION

An objective of the present invention is an active electrode composition having the consistency that can be used with a continuous electrode fabrication process to make electrode having uniform density and thickness.

Another objective of the present invention is an electrode and electrochemical cell having increased strength, durability and cycle life.

Another objective of the present invention is an electrode and electrochemical cell with decreased internal resistance and increased power.

Another objective of the present invention is an electrode and an electrochemical cell with improved rate capability.

These and other objectives of the invention are satisfied by an active composition for an electrode of an electrochemical cell, comprising: an electrode material; and a nonfibrillating polymeric binder.

These and other objectives of the invention are satisfied by an electrode for an electrochemical cell, comprising: a conductive substrate; and an active composition affixed to the substrate, the composition comprising: an electrode material; and a nonfibrillating polymeric binder.

These and other objectives of the invention are also satisfied by an electrochemical cell, comprising: a positive electrode; a negative electrode; and an electrolyte; wherein at least one element selected from the group consisting of (the positive electrode, and the negative electrode) comprises: a conductive substrate; and an active composition affixed to the substrate, the active composition comprising: an electrode material; and a nonfibrillating polymeric binder.

These and other objectives of the invention are also satisfied by a method of making an electrode for an electrochemical cell, the method comprising the steps of: mixing an electrode material and a nonfibrillating polymeric binder, whereby an active composition is formed; and affixing the active composition onto a conductive substrate.

DETAILED DESCRIPTION OF THE INVENTION

Disclosed herein is an active composition for an electrode of an electrochemical cell. The active composition comprises an electrode material, and a nonfibrillating polymeric binder. The electrode materials are active materials. Preferably, the electrode materials are powdery materials.

The electrode materials may be divided into positive electrode materials and negative electrode materials. Examples of positive electrode materials are powders of lead oxide, lithium cobalt dioxide, lithium nickel dioxide, lithium nickel dioxide, lithium manganese oxide compounds, lithium vanadium oxide compounds, lithium iron oxide, lithium compounds, i.e., complex oxides of these compounds and transition metal oxides, manganese dioxide, zinc oxide, nickel oxide, nickel hydroxide, manganese hydroxide, copper oxide, molybdenum oxide, carbon fluoride, etc. Examples of negative electrode materials include metallic lithium and like alkali metals, alloys thereof, alkali metal absorbing carbon materials, zinc, cadmium hydroxide, hydrogen absorbing alloys, etc.

Preferably, the electrode material is a hydrogen absorbing alloy. Examples of hydrogen absorbing alloys are provided above. It is within the spirit and intent of this invention that any hydrogen absorbing alloy can be used.

The nonfibrillating polymeric binder may comprise a fluoropolymer. Preferably, the nonfibrillating polymeric binder comprises a material selected from the group consisting of polytetrafluoroethylene (PTFE), fluorinated ethylene propylene (FEP), and perfluoroalkoxy (PFA). Blends or mixtures of two or more fluoropolymers may also be used. Examples of nonfibrillating PTFEs are micropowders such as the DuPont MP 1000 and MP 1100. An example of an FEP is the DuPont FEP 121A. And an example of a PFA is the DuPont 9946.

The polymeric binder used in the present invention is a nonfibrillating polymer. In contrast to the '763 Patent, which discloses a polymer having a core/shell structure where the core is a fibrillating polymer and the shell is a nonfibrillating polymer, the polymeric binder of the present invention does not include a fibrillating polymer.

Fibrillating polymers are sensitive to shear. The term "fibrillation" refers to the formation, within a polymer, of a lace-like configuration of minute fibers called "fibrils" upon exposure to heat, shear, and/or other pressure. Such fibrils are easily formed when the fibrillating polymer is mixed, stirred, extruded, compressed, or the like.

The molecular weight of the polymeric binder may serve as an index of its fibrillating property. Typically, the lower the molecular weight of the polymer the less likely the material will fibrillate. Hence, a nonfibrillating polymeric binder may be a "low molecular weight" fluoropolymer such as a low molecular weight PTFE. The low molecular weight PTFE may have a molecular weight below about 800,000. Properties of nonfibrillating and fibrillating polymers are discussed in U.S. Pat. Nos. 4,016,345, 4,332,698, 4,358,396, 4,396,693, 4,433,063, 4,639,497, 5,093,110, 5,324,785, 5,416,156, the disclosures of which are incorporated by reference herein.

The polymeric binder may be in the form of a dry powder, or in the form of a liquid suspension. The liquid suspension may be an aqueous dispersion or a nonaqueous dispersion. Examples of nonfibrillating polymeric binders that are in the form of powders are the DuPont MP 1000, MP 1100 and 7C. An example of a nonfibrillating polymeric binder which is in the form of an aqueous dispersion is the DuPont FEP 121A.

The active composition is formed by mixing the non-fribrillating polymeric binder with the active electrode material. Examples of mixing devices which may be used include blending mills, ball mills (with or without the mixing balls), sieves, and the like. Since the polymeric binder is a nonfibrillating binder, the resulting active composition has a consistency which is compatible for use with a continuous electrode fabrication process (like that disclosed in the '481 Patent). When the polymeric binder is a dry powder, the active composition formed by mixing the binder with the electrode material is powdery. When the polymeric binder is a liquid suspension, the active composition formed by mixing the binder with the electrode material is wet. It can then be dried to a powdery composition. Preferably, the active composition has a substantially nonfibrillated composition.

The polymeric binder is preferably between about 0.1 weight percent and about 10 weight percent of the active composition. More preferably, the polymeric binder is between about 0.2 and about 5 weight percent of the active material mixture.

The nonfibrillating polymeric binder may at least partially coat the active electrode material. The active electrode material is preferably a particulate -i.e., a plurality of particles. One or more of these particles may be at least partially coated by the nonfibrillating polymeric binder when the binder and the active material are mixed together.

The extent of the coverage by the nonfibrillating polymeric binder may be measured by using X-ray Photoelectric Spectroscopy (XPS). The XPS measurement provides a signal indicating the percentage of detectable fluorine compared to detectable amount of the active material. An increase in the XPS signal indicates and increase in the amount of surface area covered by the binder and/or an increase in the thickness of the coating. The XPS signal may be increased by increasing the "mixing energy" applied when mixing the polymeric binder with the active material. For example, the mixing energy may be increased by increasing the speed (RPM) of the ball mill. Also, the mixing energy may be increased by using a ball mill with mixing balls rather than a ball mill without mixing balls. The XPS signal may also be increased by increasing the mixing time.

Experiments show that the strength and durability of the electrode increases with the XPS signal of the active composition. However, it is believed that the overall performance of the electrode (when examining both mechanical as well as electrical properties) is achieved when the XPS signal is preferably between 15% and 90%, more preferably between 30% and 80%, and most preferably between 45% and 70%.

Also disclosed herein is an electrode for an electrochemical cell. The electrode comprises a conductive substrate, and a composition affixed to the conductive substrate. The composition is as described above. The composition comprises an active electrode material, and a nonfibrillating polymeric binder. Preferably, the active electrode material is a hydrogen absorbing alloy.

The conductive substrate may be any electrically conductive support structure that can be used to hold the active composition. Examples of substrates include foam, grid, plate, foil, expanded metal or any other type of support structure. The actual form of the substrate used may depend on whether the substrate is used for the positive or the negative electrode, the type of active material used, whether it is paste type or non-paste type, etc. The conductive substrate may comprise any electrically conductive material. Examples of materials that may be used include nickel, nickel alloy, copper, copper alloy, nickel-plated metals such as nickel-plated copper and copper-plated nickel, etc. The actual material used for the substrate depends upon many factors including whether the substrate is being used as the positive or negative electrode, the potential of the electrode, and the pH of the electrolyte.

The electrode may be made by compacting the active composition onto the conductive substrate. When the polymeric binder is a dry powder (for example, the DuPont MP 1000, MP 1100 and 7C), the composition remains dry after the binder and the active electrode material are mixed together, and this dry active composition may be compacted onto the surface of the conductive substrate. When the polymeric binder is a liquid suspension (such as the DuPont FEP 121A aqueous dispersion), the composition formed by mixing the active electrode material with the binder is wet. It is dried prior to being compacted onto the substrate. Compaction may be accomplished by one or more rolling mills.

The electrode of the present invention may be a hydrogen absorbing alloy electrode. In this case, the active composition comprises a hydrogen absorbing alloy, and a nonfibrillating polymeric binder. The hydrogen absorbing alloy and the nonfibrillating binder are discussed above. As discussed, the nonfibrillating polymeric binder may be a fluoropolymer such as a PTFE (such as the DuPont MP 1000). The binder and the hydrogen absorbing alloy are mixed together to form the active composition.

Preferably, the active composition is compacted onto a conductive substrate. As discussed, the conductive substrate may be any electrically conductive support structure that can be used to hold the active composition and examples of substrates include foam, grid, plate, foil, expanded metal or any other type of support structure. Preferably, the substrate of the hydrogen absorbing alloy electrode is an expanded metal. The substrate of the hydrogen absorbing electrode may comprise any electrically conductive material, and examples of material that may be used include copper, a copper alloy, nickel, a nickel alloy, a copper-plated metal (such as copper-plated nickel), a nickel-plated metal (such as nickel-plated copper), etc. Commonly assigned U.S. patent applications Ser. No. 08/792,358 and Ser. No. 08/792,359, the contents of which are incorporated by reference herein, disclose hydrogen absorbing electrodes having a hydrogen absorbing alloy active material and a substrate made from substantially pure copper.

In an alternate embodiment of the present invention, the disclosed active composition may be pasted onto the conductive substrate. A paste may be formed by adding water and a "thickener" such as carboxymethyl cellulose (CMC) or hydroxypropylmethyl cellulose (MPMC) to the active composition. The paste would then be applied to the substrate.

Also disclosed herein is an electrochemical cell comprising at least one positive electrode, at least one negative electrode, and an electrolyte. In the electrochemical cell of the present invention at least one of the positive electrodes, or at least one of the negative electrodes, or at least one of the positive electrodes and at least one of the negative electrodes is an electrode of the type disclosed above, comprising an active composition affixed to a conductive substrate where the active composition comprises an electrode material and a nonfibrillating polymeric binder. Any electrochemical cell comprising at least one electrode (either positive electrode and/or negative electrode) of this type is within the scope of the present invention.

Preferably, the electrolyte of the electrochemical cell is an alkaline electrolyte. The alkaline electrolyte is an aqueous solution of an alkali metal hydroxide. Examples of alkali metal hydroxides that may be used include potassium hydroxide, sodium hydroxide, lithium hydroxide, and mixtures thereof. Preferably, the alkali metal hydroxide is potassium hydroxide.

In one embodiment of the invention, the electrochemical cell has at least one negative electrode comprising an active composition affixed to a conductive substrate where the active composition is a mixture of a hydrogen absorbing alloy and a nonfibrillating polymeric binder. Preferably, the active composition is compacted onto the conductive substrate. Alternately, the active composition may be pasted onto the conductive substrate.

Preferably, the electrochemical cell has at least one positive electrode comprising a nickel hydroxide active material. Other positive electrode active materials, such as manganese hydroxide may be used. The nickel hydroxide or manganese hydroxide may be pasted onto a conductive substrate such as a nickel foam.

The addition of a nonfibrillating polymeric binder to an active electrode material, such as a hydrogen absorbing alloy, improves the strength, durability, and cycle life of the electrode. The binder increases the particle-to-particle bonding of the active material as well as the bonding between the active material and the substrate, thereby reducing the need to sinter (however, sintering may still be done to increase durability still further). The increased particle-to-particle and particle-to-substrate bonding keeps the electrode intact thereby reducing the chance that active material particulate may become loose and penetrate one of the separators (which can cause an electrical short).

Furthermore, because of the low coefficient of friction of fluoropolymers such as PTFE, FEP, and PFA, these materials have excellent lubricating properties. The addition of a polymeric binder to the active material increases the lubricity of the electrode material, making it more resistant to friction and abrasion.

This increased lubricity facilitates electrode fabrication. Typically, compacted electrodes are made by applying the active composition onto a substrate where the substrate is in the form of a continuous, spirally wound spool referred to as a "substrate web" (the substrate spool unwinds as it is fed into the rolling mill).

After compaction, the continuous "electrode web" (substrate with active composition) must be trimmed and sliced to form the individual electrode segments that will fit within the battery case. The polymeric binder facilitates the cutting process by ensuring that the cut edges are even and smooth rather than jagged and sharp, thereby reducing the chance that a jagged section of substrate or a loose piece of active material particulate will cause an electrical short within the cell.

The polymeric binder also decreases the gas pressure within the electrochemical cell. Fluoropolymers such as PTFE, FEP, and PFA are "hydrophobic" materials. Not wishing to be bound by theory, it is believed that the hydrophobic polymeric binder, when mixed with an active material such as a hydrogen absorbing alloy, creates "dry channels" in the active material allowing oxygen gas to enter the material bulk. This makes oxygen recombination more efficient and lowers the pressure of both the oxygen and hydrogen gases within the cell.

In addition to the benefits discussed above, the addition of a nonfibrillating polymeric binder to an active electrode material also provides unexpected improvements in the electrical properties of the electrode. The polymeric binder decreases the internal resistance of the electrode, thereby lowering the amount of power wasted within the electrochemical cell due to internal dissipation and increasing the amount of power available to supply to an external load. Given that polymeric materials have low electrical conductivity (and make good electrical insulators), the decrease in internal resistance is truly an unexpected result. While not wishing to be bound by theory, it is believed that the decrease in internal resistance is due, at least in part, to a decrease in the charge transfer resistance of the hydrogen absorbing alloy. It is believed that the decrease in the charge transfer resistance may be due to an increase in the catalytic properties of the surface of the hydrogen absorbing alloy caused by the addition of the polymeric binder. This may be due to the hydrophobic properties of the binder. The decreased internal resistance of the electrode may also be due to a decrease in the ohmic resistance of the electrode.

The addition of the nonfibrillating polymeric binder also increases the rate capability of the electrochemical cell. The rate capability is a measure of the percentage of full capacity of the cell versus discharge rate. While not wishing to be bound by theory, it is believed that the increase in rate capacity may be due to an increase in the bulk diffusion of hydrogen species into the hydrogen absorbing alloy particulate. This may also be due to the hydrophilic properties of the polymeric binder.

The addition of the binder also increases the packing density of the active material. As discussed above, the polymeric binder has a low coefficient of friction and is an excellent lubricant. This lubricity permits increased packing of the active material particulate, thereby increasing the amount of active material that can fit within a cubic volume.

Also disclosed herein is a method of making an electrode for an electrochemical cell. The method comprises the steps of mixing an electrode material and a nonfibrillating binder, whereby an active composition is formed; and then affixing the active composition onto a conductive substrate. As discussed above, examples of equipment which can be used to perform the mixing step include ball mills (with or without the mixing balls), blending mills, a sieves, or the like.

The affixing step may be accomplished by compacting the active material onto the conductive substrate. An example of equipment which can be use to perform the compacting step includes one or more rolling mills. Alternately, the affixing step may be accomplished by pasting the active composition onto the conductive substrate. The electrode material, the nonfibrillating polymeric binder, and the conductive substrate are as described herein. The electrode material may comprise a hydrogen absorbing alloy. After the active composition is affixed onto the conductive substrate, the resulting "electrode web" (i.e., substrate with active composition affixed thereon) may be sintered.

EXAMPLE 1

About 1.5 weight percent of DuPont MP 1000 PTFE is mixed with a hydrogen absorbing alloy. Negative electrodes are formed by compacting the active material mixture onto conductive substrates in the form of expanded metal plates. Positive electrodes are formed by pasting a nickel hydroxide active material onto conductive substrates in the form of nickel foam. Table 1 below compares the internal pressure, internal resistance, and percent capacity at a 2C discharge rate (to a 0.9 volt cutoff) for electrochemical cells fabricated with the polymeric binder and without the polymeric binder (the control).

TABLE 1

|  | Cell (control) | Cell (with binder) |
| --- | --- | --- |
| Internal Pressure | 170 psi | 111 psi |
| Internal Resistance | 38 milliohms | 29 milliohms |
| % Capacity (2C rate) | 77% | 90% |

EXAMPLE 2

About 1.5 weight percent of FEP 121A aqueous dispersion is mixed with a hydrogen absorbing alloy. The wet mixture is dried in an oven to form a dry powder. Negative electrodes are formed by compacting the dry powder onto conductive substrates in the form of expanded metal plates. Positive electrodes are formed by pasting a nickel hydroxide active material onto conductive substrates in the form of nickel foam. Table 2 below compares the internal pressure, internal resistance, and percent capacity at a 2C discharge rate (to a 0.9 volt cutoff) for electrochemical cells fabricated with the polymeric binder and without the polymeric binder (the control).

TABLE 2

| Cell (control) |  | Cell (with binder) |
| --- | --- | --- |
| Internal Pressure | 170 psi | 58 psi |
| Internal Resistance | 38 milliohms | 27 milliohms |
| % Capacity (2C rate) | 77% | 87% |

While the invention has been described in connection with preferred embodiments and procedures, it is to be understood that it is not intended to limit the invention to the preferred embodiments and procedures. On the contrary, it is intended to cover all alternatives, modifications and equivalence which may be included within the spirit and scope of the invention as defined by the claims appended hereinafter.

We claim:

1. An active composition for a metal hydride electrode, comprising:
   a hydrogen absorbing alloy; and
   a nonfibrillating polymeric binder, said active composition substantially free of a fibrillating polymer.
2. The composition of claim 1, wherein said binder comprises a fluoropolymer.
3. The composition of claim 1, wherein said binder comprises a material selected from the group consisting of polytetrafluoroethylene, fluorinated ethylene propylene, and perfluoroalkoxy.
4. The composition of claim 1, wherein said binder comprises a low molecular weight polytetrafluorethylene.
5. The composition of claim 1, wherein said binder is a powder.
6. The composition of claim 1, wherein said binder is an aqueous dispersion.
7. The composition of claim 1, wherein said binder is a nonaqueous dispersion.
8. The composition of claim 1, wherein said binder at least partially coats said electrode material.

9. A metal hydride electrode, comprising:
   a conductive substrate; and
   an active composition affixed to said substrate, said composition comprising:
      a hydrogen absorbing alloy; and
      a nonfibrillating polymeric binder, said active composition substantially free of a fibrillating polymer.
10. The electrode of claim 9, wherein said binder comprises a fluoropolymer.
11. The electrode of claim 9, wherein said binder comprises a material selected from the group consisting of polytetrafluoroethylene, fluorinated ethylene propylene, and perfluoroalkoxy.
12. The electrode of claim 9, wherein said binder comprises a low molecular weight polytetrafluorethylene.
13. The electrode of claim 9, wherein said binder is a powder.
14. The electrode of claim 9, wherein said binder is an aqueous dispersion.
15. The electrode of claim 9, wherein said binder is a nonaqueous dispersion.
16. The electrode of claim 9, wherein said binder at least partially coats said electrode material.
17. The electrode of claim 9, wherein said composition is compacted onto said substrate.
18. The electrode of claim 9, wherein said composition is pasted onto said substrate.
19. An electrochemical cell, comprising:
   a positive electrode;
   a negative electrode, and
   an electrolyte,
   said negative electrode comprising:
      a conductive substrate; and
      an active composition affixed to said substrate, said composition comprising:
         a hydrogen absorbing alloy; and
         a nonfibrillating polymeric binder, said active composition substantially free of a fibrillating polymer.
20. The electrochemical cell of claim 19, wherein said binder comprises a fluoropolymer.
21. The electrochemical cell of claim 19, wherein said binder comprises a material selected from the group consisting of polytetrafluoroethylene, fluorinated ethylene propylene, and perfluoroalkoxy.
22. The electrochemical cell of claim 19, wherein said binder comprises a low molecular weight polytetrafluorethylene.
23. The electrochemical cell of claim 19, wherein said binder is a powder.
24. The electrochemical cell of claim 19, wherein said binder is an aqueous dispersion.
25. The electrochemical cell of claim 19, wherein said binder is a nonaqueous dispersion.
26. The electrochemical cell of claim 19, wherein said binder at least partially coats said electrode material.
27. The electrochemical cell of claim 19, wherein said composition is compacted onto said substrate.
28. The electrochemical cell of claim 19, wherein said composition is pasted onto said substrate.
29. The electrochemical cell of claim 19, wherein said electrolyte is an alkaline electrolyte.
30. The electrochemical cell of claim 19, wherein said positive electrode comprises a nickel hydroxide active material.

* * * * *